Patented Dec. 9, 1941

2,265,913

UNITED STATES PATENT OFFICE 2,265,913

HYDROXY ALKYL-ALKYL ETHERS OF CELLULOSE

Leon Lilienfeld, Vienna, Austria; Antonie Lilienfeld, administratrix of said Leon Lilienfeld, deceased, assignor to Lilienfeld Patents Inc., Boston, Mass., a corporation of Massachusetts No Drawing. Application October 20, 1937, Serial No. 170,123. In Great Britain July 17, 1933

11 Claims. (Cl. 260—209)

The present invention relates to hydroxyalkyl-alkyl derivatives of carbohydrates of the type $n(C_6H_{10}O_5)$ which are soluble in water at and/or below room temperature, and soluble in dilute alcohol and which, notwithstanding their solubility in water, are soluble in benzol, and to a process for making such hydroxyalkyl-alkyl derivatives.

Many of the hydroxyalkyl-alkyl derivatives of carbohydrates of the type $n(C_6H_{10}O_5)$ prepared according to the present invention are also soluble in strong alcohol and in other organic solvents, such as acetone.

The process comprises first acting in the presence of an alkali upon a carbohydrate of the type $n(C_6H_{10}O_5)$ with a hydroxyalkylating agent in an amount not smaller than two molecules of hydroxyalkylating agent per one $C_6H_{10}O_5$-molecular unit of the carbohydrate, and thereafter acting upon the hydroxyalkyl derivative of the carbohydrate so formed with an alkylating agent in the presence of an alkali.

I prefer to use in the hydroxyalkylating step of the present invention not less than three and preferably not less than four molecules of hydroxyalkylating agent per one $C_6H_{10}O_5$-molecular unit of the carbohydrate.

I further prefer to use in the hydroxyalkylating step of the present invention not less than three and preferably not less than four parts by weight of caustic alkali, calculated as NaOH, per one part by weight of the carbohydrate and in the subsequent alkylating, for example ethylating, step of the present invention not less than three and preferably not less than four parts by weight of caustic alkali, calculated as NaOH, per one part by weight of the carbohydrate.

As stated above, according to the present process, hydroxyalkyl-alkyl ethers of carbohydrates of the type $n(C_6H_{10}O_5)$ are obtained which are soluble not only in water and aqueous alcohol, but also in benzol and in many cases also in strong alcohol or in ether or in mixtures of benzol and alcohol or of ether and alcohol, in short, in such solvents or mixtures of solvents as hitherto have been known as solvents for such cellulose ethers as are insoluble in water but are soluble in organic solvents.

It is a surprising feature of the present invention that, in many cases in which not less than two, and preferably not less than three or four or more molecules of hydroxyalkylating agent per one $C_6H_{10}O_5$-molecular unit of cellulose or starch or dextrin or the like and in which not less than three, and preferably not less than four parts by weight of caustic alkali, calculated as NaOH, per one part by weight of cellulose or starch or dextrin or the like are used in the hydroxyalkylating step of the present invention, even then hydroxyalkyl-alkyl derivatives result which are soluble in water at room temperature and/or below room temperature and in dilute alcohol and which are also soluble in benzol and in many cases are also soluble in other organic solvents in which in general only water-insoluble ethers are soluble, when such proportions of caustic alkali and alkylating agent are employed in the subsequent alkylating step of the present invention as with cellulose or starch or dextrin or the like or with hydroxyalkyl cellulose or hydroxyalkyl starch or hydroxyalkyl dextrin prepared with smaller quantities of hydroxylalkylating agent, give hydroxyalkyl-alkyl derivatives of cellulose or starch or dextrin which are insoluble in water, but only soluble in organic volatile solvents, such as benzol, benzol-alcohol mixture, or ether or the like.

In order to explain the nature of the present invention, the following examples are set forth. It is to be understood that the invention is not limited to these examples; all the less so, since other modes of carrying out the invention will suggest themselves to persons skilled in the art. The parts are by weight:

Example 1

In a suitable apparatus or machine (for example a Werner-Pfleiderer shredder) 1000 parts of cellulose are mixed with 2000 parts of caustic soda solution of 50 per cent. strength and 3000 parts of powdered caustic soda until the mass is homogeneous, the temperature during mixing not exceeding 20° C. During mixing the alkali cellulose is allowed to absorb from the air 150 parts of water.

The alkali cellulose thus obtained is (either in the fresh state or after having stood at room temperature or at 15° C. for several hours or several days) treated in a closed chamber (for example a rotating autoclave) with 4500 parts of ethylene oxide at room temperature for 24 to 48 hours.

The product of the reaction is a flocculent mass which is insoluble or only scarcely soluble in water, alcohol and glacial acetic acid, but at least partially soluble in dilute caustic alkali solution.

It is (either immediately or after having remained for several hours or several days at room temperature) placed in a rotating autoclave and 4000 parts of ethyl chloride (which may be diluted with benzol or not so diluted) are added and the reaction mixture heated at 110° C. for 8 to 12 hours.

The crude reaction product which is a soft mass is mixed with hot water, brought on a hot water funnel, and washed with hot water until free from electrolytes. The washed precipitate is then dried in the heat. The dried product is soluble in water at room temperature or at a temperature below room temperature, for example at 1° C. It is further soluble in glacial acetic acid and in aqueous alcohol, for instance of 40 to 80 per cent. strength.

It may be further purified according to the process described in my co-pending application Ser. No. 735,522, for example as follows:

The washed substance is dissolved in water in such a manner as to yield a solution containing 3 per cent. of the dry substance to which solution 5 per cent. of sodium chloride calculated on the weight of the solution are added and the solution allowed to remain at room temperature for 24 hours.

After that time the solution is heated to boiling, kept boiling for 3 minutes and is then cooled or allowed to cool and allowed to stand in a room at normal temperature for 24 to 48 hours.

After that time the mass is stirred for about 10 minutes and filtered. Thereupon, the clear filtrate is brought to boiling, kept boiling for a few minutes and the precipitate thus obtained collected on a hot water funnel, washed with hot water and then dried.

The thus purified final product is a mass the consistency of which resembles a soft resin. It is soluble in various organic solvents, such as alcohol, benzol, benzol-alcohol mixture, acetone and also in cold water and is precipitable from its aqueous solution in the heat.

The body obtained in the foregoing example may be further purified by dissolving it in water, dialysing the aqueous solution thus obtained and then evaporating the water to dryness.

The sodium chloride is used in this example as illustrating a salt. Sodium sulphate is another suitable illustration. The salt used can be added in the solid state or in solution.

Example 2

In a suitable apparatus or machine (for example a Werner-Pfleiderer shredder) 1000 parts of soluble starch are mixed with a mixture of 4000 parts of caustic soda solution of 50 per cent. strength and 1500 parts of powdered caustic soda until the mass is homogeneous, the temperature during mixing not exceeding 10 to 11° C. During mixing the alkali starch is allowed to absorb from the air 150 parts of water.

The alkali starch thus obtained is (either in the fresh state or after having stood at room temperature or at 15° C. or at 0 to 5° C. for several hours or several days) treated in a closed chamber (for example a rotating autoclave) with 4500 parts of ethylene oxide at room temperature for 12 to 24 hours.

The thus obtained hydroxyethyl starch is, either immediately or after having remained for several hours or several days at room temperature (if the alkylation is carried out immediately after the hydroxyalkylation), left, or (if, before being alkylated, the hydroxyalkyl starch is allowed to stand) placed in a rotating autoclave, whereupon 4000 parts of ethyl chloride (which may or may not be diluted with benzol) are added and the reaction mixture heated to 110° C. and then kept at this temperature for 12 hours.

The crude reaction mass which consists of a faintly yellow jam-like mass and of a supernatant faintly yellow clear liquid is neutralized with sulphuric acid of 5 to 10° C. After the neutralization with sulphuric acid some crystals of $Na_2SO_4$ settle to the bottom of the vessel, whereupon the supernatant liquid is decanted and then dialysed towards water until free from electrolytes. Thereafter, the solution purified by dialysis is concentrated by distillation under reduced pressure at 40° C. and the concentrated solution is filtered. The filtrate thus obtained is now freed from the water by distillation under reduced pressure.

The resultant hydroxyalkyl-alkyl ether of starch is an opaque mass having a consistency reminding of honey or of a soft resin.

If desired, it may be purified by dissolving it in alcohol of 40 per cent. strength, filtration of the solution and concentration of same until constant weight.

The final product is soluble in water at room temperature or at a temperature below room temperature, for example at 1° C. It is further soluble in dilute alcohol, for example of 40 per cent. strength, in strong alcohol, for example of 80 to 90 per cent. strength and in benzol and also in acetone and glacial acetic acid.

Example 3

In a suitable apparatus (such as a Werner-Pfleiderer shredder or an edge-runner) 1000 parts of starch or dextrin are mixed with 960 parts of caustic soda solution of 50 per cent. strength, 200 parts of powdered caustic soda and 470 parts of sodium carbonate (which may contain about 15 per cent. of water recoverable by heating to 105° C.), the temperature during mixing not exceeding 20° C. During mixing the alkali starch or alkali dextrin respectively is allowed to absorb from the air 90 parts of water.

To the alkali starch or alkali dextrin thus prepared which represents a soft, dough-like mass, 1933 parts of ethylene chlorohydrin are added whilst stirring or kneading the mass. After having become homogeneous, the mass is allowed to stand over night at room temperature. After that time the mass is cooled down to about 5° C. and 700 parts of powdered caustic soda are added to it in small portions, the cooling being continued during the addition of the solid caustic soda in such a manner as not to allow the temperature to rise above 20° C.

The thus obtained alkali compound of the hydroxyethyl starch or hydroxyethyl dextrin respectively, is placed in a rotating autoclave, whereupon 85 parts of sodium carbonate (which may contain about 15 per cent. of water removable by heating to 105° C.) and a mixture of 1600 parts of ethyl chloride and 3000 parts of benzol are added and the reaction mass heated to 110° C. for 12 hours.

The reaction product consists of a solid, finely divided body and a liquid.

The solid and the liquid part are separated from each other by filtration, decantation, pressing or centrifuging and the solid part extracted with several portions of benzol. The benzol extract is then united with the original liquid part of the crude reaction product. The thus obtained solution of the reaction product in benzol is concentrated and precipitated with ether and the precipitate thus obtained washed with ether whilst stirring or kneading until, on evaporation, the washing ether does not leave behind any considerable residue. After drying, the washed body represents a finely divided, almost powdery, yellowish substance which is soluble in water, alcohol and benzol.

The product may be purified by dissolving it in strong alcohol and precipitating with ether.

Example 4

The process is conducted as in Example 3, but with the difference that the amount of powdered caustic soda incorporated with the alkali compound of the hydroxyethyl starch or hydroxyethyl dextrin respectively, is not 700, but 1400 parts and that the isolation of the final product from its solution in benzol is effected by precipitating the benzol solution with petroleum ether.

Example 5

The process is conducted as in Example 3, but with the difference that, instead of ethylene chlorohydrin, 1830 parts of alpha-monochlorohydrin are used and that the isolation of the final product from its solution in benzol is effected by precipitating the benzol solution with petroleum ether.

Example 6

In a shredder or edge-runner 1000 parts of starch or dextrin are intimately mixed with 500 parts of caustic soda solution of 50 per cent strength and 500 parts of powdered caustic soda, the mixing being conducted in such a manner as to allow the alkali starch or alkali dextrin or the like to absorb from the air about 300 parts of water, the temperature during mixing not exceeding 25° C.

To the thus obtained alkali starch or alkali dextrin 1500 parts of ethylene chlorohydrin are added in small portions with stirring or kneading until the reaction mass becomes homogeneous.

Either immediately or after having remained at room temperature for 24 hours or longer, the reaction mass is placed in a suitable mixing machine and 900 parts of powdered caustic soda are incorporated with it, the temperature of the mixing with the powdered caustic soda not exceeding 20° C.

The thus obtained alkali-hydroxyethyl starch or alkali-hydroxyethyl dextrin respectively, is immediately after its preparation or after having been allowed to mature for a shorter or longer time, placed in a rotating autoclave and ethylated with a mixture of 1600 parts of ethyl chloride with 3000 parts of benzol for 12 hours at 100 to 110° C.

The final reaction mass is worked up as in Example 4.

Example 7

The process is conducted as in Example 6, but with the difference that, instead of the stated 900 parts, 1750 parts of powdered caustic soda are used.

Example 8

In a shredder or edge-runner 1000 parts of starch or dextrin or the like are intimately mixed with 500 parts of caustic soda solution of 50 per cent strength and 1000 parts of powdered caustic soda, the mixing being conducted in such a manner as to allow the alkali starch or alkali dextrin or the like to absorb from the air 170 parts of water, the temperature during mixing not exceeding 20° C.

To the thus obtained alkali starch or alkali dextrin or the like 2500 parts of ethylene chlorohydrin are added in small portions with stirring or kneading until the mass becomes homogeneous.

Either immediately or after it has stood at room temperature for 24 hours or longer, the reaction mass is placed in a suitable mixing machine and 1260 to 1740 parts of powdered caustic soda are incorporated with it, the temperature of the mixing with the powdered caustic soda not exceeding about 20° C.

The thus obtained alkali-hydroxyethel starch or alkali-hydroxyethyl dextrin respectively, is immediately after its preparation or after having been allowed to mature for a shorter or longer time, placed in a rotating autoclave and ethylated with a mixture of 1600 parts of ethyl chloride with 3000 parts of benzol for 12 hours at 100 to 110° C.

The reaction mass thus obtained is worked up exactly as in Example 4.

Example 9

In a shredder or edge-runner 1000 parts of starch or dextrin are mixed with 1250 parts of powdered caustic soda. The mixing step is conducted with cooling in such a manner as to keep the temperature below 10° C.

As soon as the mass is homogeneous, it is transferred to a closed chamber (such as a rotating autoclave) and treated therein with 2500 parts of ethylene chlorohydrin for 24 to 48 hours at room temperature.

The product thus obtained is placed in a shredder and 1040 parts of powdered caustic soda are added in small portions. The thus obtained product is either in the fresh state or after having matured for a shorter or longer time placed in a rotating autoclave and treated therein with 1600 parts of ethyl chloride which are diluted with 3000 parts of benzol at 110° C. for 12 hours.

The final reaction mixture is worked up as in Example 8.

The purification of the products of this invention may be effected by dissolving the final product in water, dialysis and then evaporation of the water to dryness.

In the foregoing examples, instead of the ethylene-glycol ethers or propylene-glycol ethers or glycerine ethers of cellulose or starch or dextrin, there may be used ethylene-glycol ethers or propylene-glycol ethers or glycerine ethers of other carbohydrates of the type $n(C_6H_{10}O_5)$, for example of inuline, or of lichenin, or of the carbohydrates of tragacanth, or of a vegetable gum, in short of any carbohydrate of the type $n(C_6H_{10}O_5)$ belonging to the systems Nos. 4764 to 4774 inclusive of Beilstein's: System der organischen Verbindungen, Berlin 1929, page 144.

The expression "carbohydrate of the type $n(C_6H_{10}O_5)$" used in the description and claims is intended to include all bodies belonging to the systems Nos. 4764 to 4774 inclusive of Beilstein's: System der organischen Verbindungen, Berlin 1929, page 144, and also set forth under the heading "Die nicht zuckerähnlichen Produkte" on pages 1024 to 1051 of the second part of the first volume of Victor Meyer and Paul Jacobson's: Lehrbuch der organischen Chemie, second edition, 1923.

The term "alkyl derivative" or "alkyl ether" used in the description and claims is, wherever the context permits, intended to include simple and mixed alkyl derivatives, simple and mixed hydroxyalkyl derivative and such mixed ethers as contain alkyl and hydroxyalkyl groups.

The term "cellulose" used in the description and claims is, wherever the context permits, intended to include cellulose, its conversion and oxidation products, such as cellulose hydrate, hydrocellulose, oxycellulose, acidcellulose and the like.

The term "hydroxyalkyl" is intended to include the halogenated or non-halogenated radicals of di-or polyvalent alcohols including also the anhydrides thereof in conjunction with one or more oxygens or hydroxyls.

Wherever the context permits, the terms "alkyl," "alkylate," "alkylating agent," "alkylation" are intended to include unsubstituted or substituted (for example aralkyl groups) alkyl groups, alkylate with alkylating agents that contain unsubstituted or substituted (for example aralkyl groups) alkyl groups, alkylating agents that contain unsubstituted or substituted (for example aralkyl groups) alkyl groups, alkylation with alkylating agents that contain unsubstituted or substituted (for example aralkyl groups) alkyl groups.

The terms "alkyl," "alkylation," "alkylate" etc. are intended to cover also "aralkyl," "aralkylation," "aralkylate," etc.

This application is a continuation in part of my U. S. patent application Ser. No. 735,521.

What I claim is:

1. As new products, hydroxyalkyl-alkyl derivatives of carbohydrates of the type $n(C_6H_{10}O_5)$ which are soluble in water and in benzol, at least one hydroxyl hydrogen atom of the carbohydrate being substituted by alkyl, and at least another one by hydroxyalkyl.

2. As new products, hydroxyalkyl-alkyl derivatives of carbohydrates of the type $n(C_6H_{10}O_5)$ which are soluble in water at room temperature and in benzol, at least one hydroxyl hydrogen atom of the carbohydrate being substituted by alkyl, and at least another one by hydroxyalkyl.

3. As new products, hydroxyalkyl-alkyl derivatives of carbohydrates of the type $n(C_6H_{10}O_5)$ which are soluble in water at room temperature, in dilute alcohol and in benzol.

4. As new products, hydroxyalkyl-alkyl derivatives of carbohydrates of the type $n(C_6H_{10}O_5)$ which are soluble in water at room temperature, in strong alcohol, in dilute alcohol and in benzol.

5. As new products, hydroxyalkyl-alkyl derivatives of carbohydrates of the type $n(C_6H_{10}O_5)$ which are soluble in water at below room temperature and in benzol.

6. As new products, hydroxyalkyl-alkyl derivatives of carbohydrates of the type $n(C_6H_{10}O_5)$ which are soluble in water at room temperature and at below room temperature, soluble in strong alcohol, soluble in dilute alcohol, soluble in benzol, soluble in benzol-alcohol mixture, and soluble in acetone.

7. As a new product, a hydroxyalkyl-alkyl derivative of a carbohydrate of the type $n(C_6H_{10}O_5)$ selected from the group consisting of cellulose, starch and dextrin, which hydroxyalkyl-alkyl derivative is soluble in water and soluble in benzol.

8. As a new product, a hydroxyalkyl-alkyl derivative of a carbohydrate of the type $n(C_6H_{10}O_5)$ selected from the group consisting of cellulose, starch and dextrin, which hydroxyalkyl-alkyl derivative is soluble in water at room temperature, soluble in strong alcohol, soluble in dilute alcohol, soluble in benzol, soluble in benzol-alcohol mixture and soluble in acetone.

9. As a new product, a hydroxyalkyl-alkyl derivative of a carbohydrate of the type $n(C_6H_{10}O_5)$ selected from the group consisting of cellulose, starch and dextrin, which hydroxyalkyl-alkyl derivative is soluble in water at below room temperature and in benzol.

10. As a new product, a hydroxyalkyl-alkyl derivative of a carbohydrate of the type $n(C_6H_{10}O_5)$ selected from the group consisting of cellulose, starch and dextrin, which hydroxyalkyl-alkyl derivative is soluble in water at room temperature and at below room temperature, soluble in strong alcohol, soluble in dilute alcohol, soluble in benzol-alcohol mixture and soluble in acetone.

11. As a new product, a hydroxyalkyl-alkyl derivative of a carbohydrate of the type $n(C_6H_{10}O_5)$ selected from the group consisting of inuline, lichenin, tragacanth, agar-agar and a vegetable gum, which hydroxyalkyl-alkyl derivative is soluble in water and soluble in benzol.

LEON LILIENFELD.